(12) United States Patent
Moon

(10) Patent No.: US 7,421,863 B2  
(45) Date of Patent: Sep. 9, 2008

(54) WASHER

(75) Inventor: Gyeong Ho Moon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 11/033,890

(22) Filed: Jan. 13, 2005

(65) Prior Publication Data

US 2005/0262882 A1 Dec. 1, 2005

(30) Foreign Application Priority Data

Jun. 1, 2004 (KR) .................. 10-2004-0039506

(51) Int. Cl.
*D06F 33/02* (2006.01)

(52) U.S. Cl. .................... 68/12.03; 68/12.12

(58) Field of Classification Search ............... 68/12.03, 68/12.12

See application file for complete search history.

(56) References Cited

U.S. PATENT DOCUMENTS

| | | | |
|---|---|---|---|
| 5,390,385 A * | 2/1995 | Beldham ................. | 8/158 |
| 6,035,472 A * | 3/2000 | Barbe ..................... | 8/158 |
| 6,337,694 B1 * | 1/2002 | Becker et al. ............ | 345/684 |
| 6,502,265 B2 * | 1/2003 | Blair et al. .............. | 8/159 |
| 6,873,255 B2 * | 3/2005 | Gallagher ................ | 340/531 |
| 2003/0015460 A1 | 1/2003 | Ballman et al. | |

FOREIGN PATENT DOCUMENTS

| | | |
|---|---|---|
| DE | 100 35 642 C1 | 12/2001 |
| JP | 07303786 A | 11/1995 |

* cited by examiner

*Primary Examiner*—Frankie L Stinson  
(74) *Attorney, Agent, or Firm*—Birch, Stewart, Kolasch & Birch, LLP

(57) ABSTRACT

A washer enhances user convenience by scrolling on a display unit information indicative of the washer's operational state, according to a setup input via button and dial units. The washer includes an input unit for receiving setup items for the washing cycle such as a water supply quantity, a washing course, and the like from a user; a display for displaying a large quantity of information indicating an operational state of a body by scrolling; and a microcomputer for controlling an operation according to a value transferred from the input unit and implementing information according to a control result to be displayed via the display by scrolling.

6 Claims, 5 Drawing Sheets

WASHER

This application claims the benefit of Korean Application No. 10-2004-39506 filed on Jun. 1, 2004, which is hereby incorporated by reference.

BACKGROUND OF THE INVENTION

1. Field of the Invention

The present invention relates to a washer, by which information for an operational state of the washer is scrolled on a display by setting up a scroll direction through a simple operation.

2. Discussion of the Related Art

Generally, a washer is an apparatus for removing filth from laundry. Water is supplied enough for the laundry to be submerged under the water. An appropriate amount of detergent is dissolved in the water to remove the filth attached to the laundry by chemical reaction with the detergent. A tub holding the laundry therein is rotated to generate mechanical friction or vibration between the water and the laundry to facilitate the removal of the filth from the laundry.

A washer according to a related art, as shown in FIG. 1, generally includes an input unit for selecting a step of a washing cycle of washing, rinsing, or dewatering and reserving the selected washing cycle and a display unit displaying a reserved time or a time of the reserved washing cycle.

The washer includes a tub receiving laundry therein, a motor rotating the tub, a microcomputer controlling the washing cycle of the washer and overall items of the washer, and water supply and drain valves turned on/off by a control of the microcomputer. Hence, the washer carries out the washing cycle of the laundry received in the tub according to the washing cycle selected by the input unit.

The display unit displays the reserved time and an operational time according to the washing cycle of the washer via LED. The display unit displays setup items for washing water and hot/cold water in a manner of turning on LED.

Moreover, the display unit may consist of a liquid crystal display (LCD) through which characters indicating information appear to enable a user to understand an operational state of the washer.

However, the display unit displays the data limited to the basic washing only. Even if the liquid crystal display is employed, a multitude of procedures need to be executed to check a lot of information. Hence, it is difficult for a user to recognize the details of the washing cycle.

Moreover, in case of displaying a lot of information by enlarging a size of the liquid crystal display, a size of the display unit of the washer needs to be increased accordingly and a product cost is raised.

SUMMARY OF THE INVENTION

Accordingly, the present invention is directed to a washer that substantially obviates one or more of the problems due to limitations and disadvantages of the related art.

An object of the present invention, which has been devised to solve the foregoing problem, lies in providing a washer, which enhances user convenience by scrolling a large quantity of information for an operational state of the washer on a display according to a setup input via button and dial units.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a washer comprising an input unit for receiving setup items for the washing cycle such as a water supply quantity, a washing course, and the like from a user; a display for displaying a large quantity of information indicating an operational state of a body by scrolling; and a microcomputer for controlling an operation according to a value transferred from the input unit and implementing information according to a control result to be displayed via the display by scrolling.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations where possible.

Figure 1:
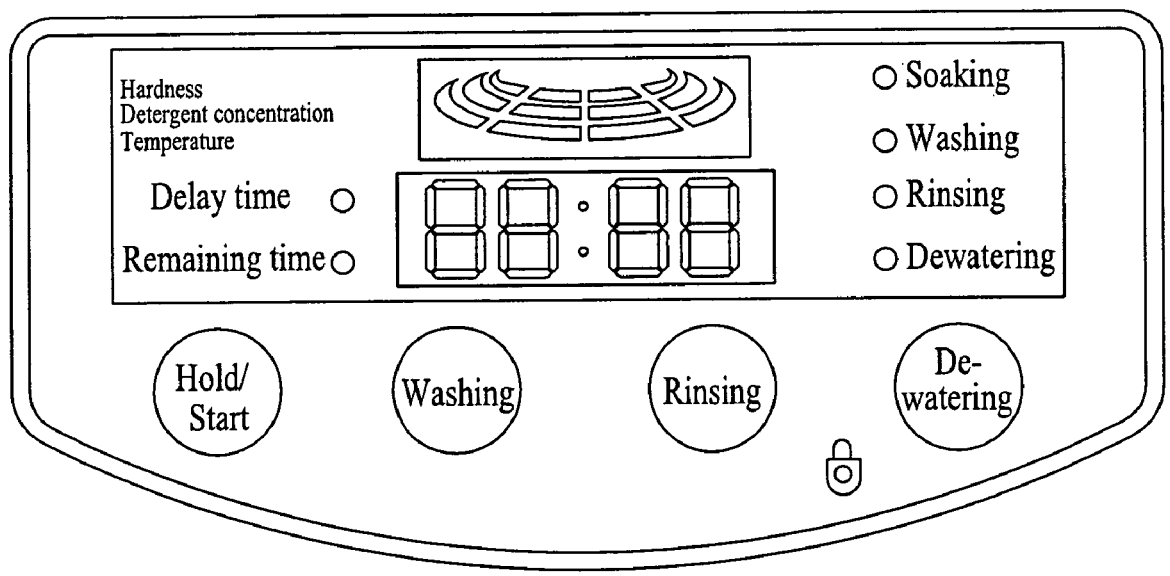
FIG. 1 is a plan view of a button unit and a display unit of a general washer.
Figure 2:
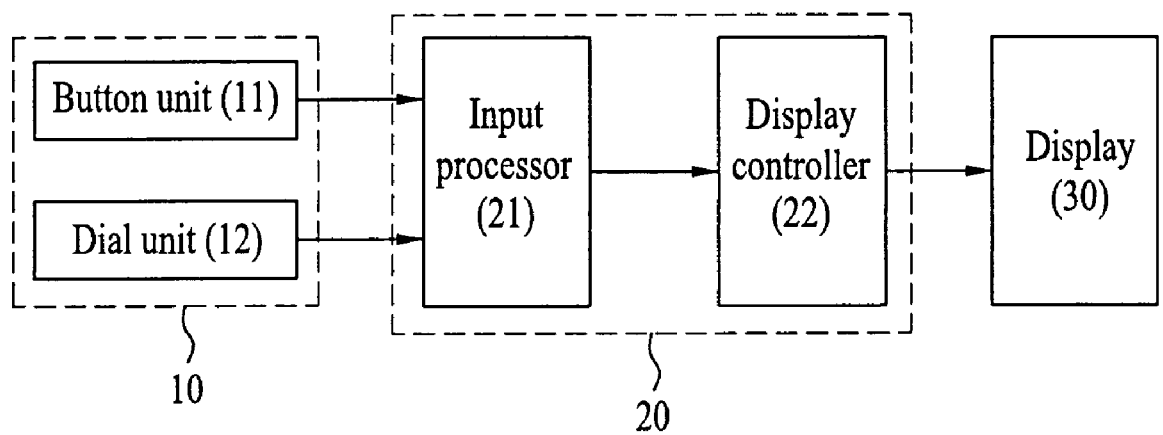
FIG. 2 is a block diagram of a washer according to the present invention.
Figure 3:
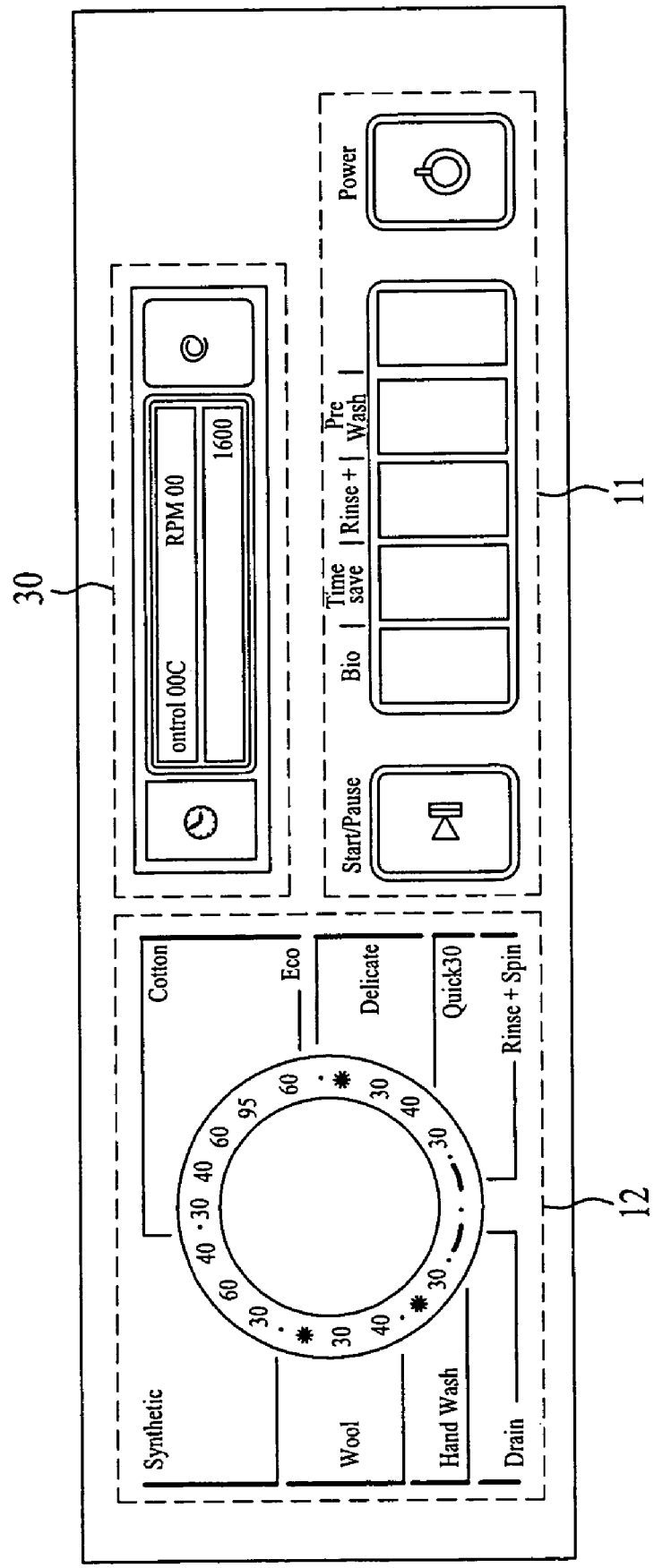
FIG. 3 is a plan view of a washer according to the present invention.

As shown in FIG. 2 and FIG. 3, a washer according to the present invention includes a display 30 transferring a large amount of information by scrolling an operational state for a washing cycle of the washer and an input unit 10 receiving setup items for the washing cycle such as a water supply quantity, a washing course, and the like according to a user selection. The washer further includes a microcomputer 20 performing the washing cycle according to the setup items inputted via the input unit 10 and implementing information of the washing cycle of the washer to be displayed via the display 30 by scrolling.

Figure 4:
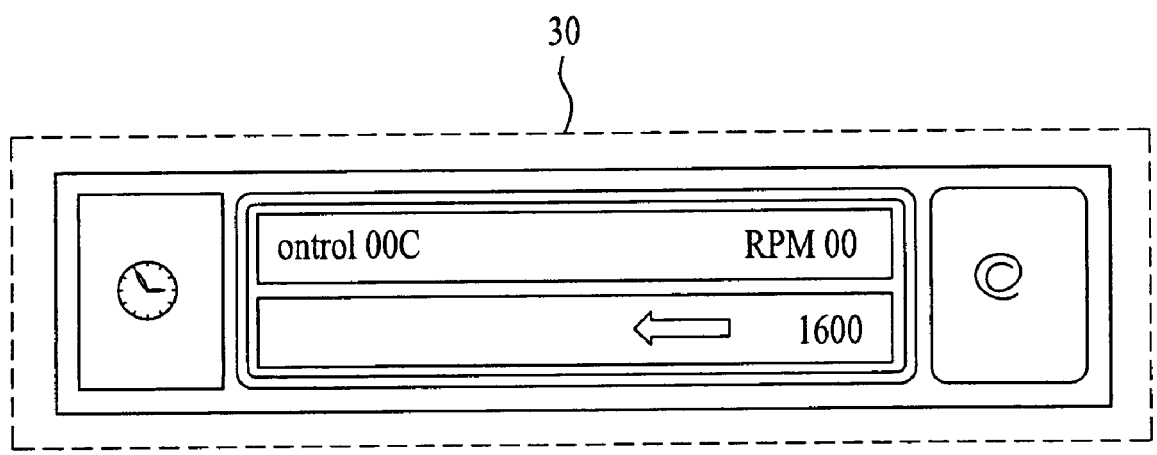
FIG. 4 is a plan view of the display of FIG. 3.

The input unit 10 includes a button unit 11 configured with a plurality of option buttons for setting up an operation for the washing cycle and a dial unit 12 for setting up the washing cycle according to a washing course and laundry. Specifically, if at least two of a plurality of the option buttons are randomly pressed during several seconds simultaneously, the display 30 is switched to a menu mode for setting up a scroll direction by the button unit 11. The selected scroll setup is stored by a power button of a plurality of the buttons. In doing so, the dial unit 12 sets up the scroll direction by a rotational operation of the dial in case of the scroll setup state by the button unit 11. An initial value of the scroll direction is set up by a left scroll, as shown in FIG. 4. The dial unit 12 changes the scroll direction into a left, right, up, or down direction according to each rotational operation of the dial. The dial unit 12 makes the setup of the scroll direction appear repeatedly in case of a continuous rotational operation of the dial.

The microcomputer 20 includes an input processor 21 processing contents inputted from the random button input of the button unit 11 and the dial unit 12 and a display controller 22 scrolling a large quantity of information on the display 30 according to a value set by the input processor 21. The input processor 21 enables the washing cycle according to a general input of the button unit 11. In case that at least two random buttons are pressed for several seconds, the input processor 21 recognizes the inputs of the button unit 11 and the dial unit 12 as an input for a scroll setup and then sets up the scroll direction. If the power button is pressed, the input processor 21 allows the scroll setup to be stored. The display controller 22 displays a scroll setup menu on the display 30 according to the above selected and stored setup and allows the information of the washing cycle of the washer to be scrolled on the display 30.

Hence, even if the display 30 of the washer is provided with a small liquid crystal display, the state information of the washer is scrolled thereon to transfer a large quantity of information to a user. Thus, the present invention can reduce an area occupied by the display of the washer for which a large display is unnecessary.

Figure 5:
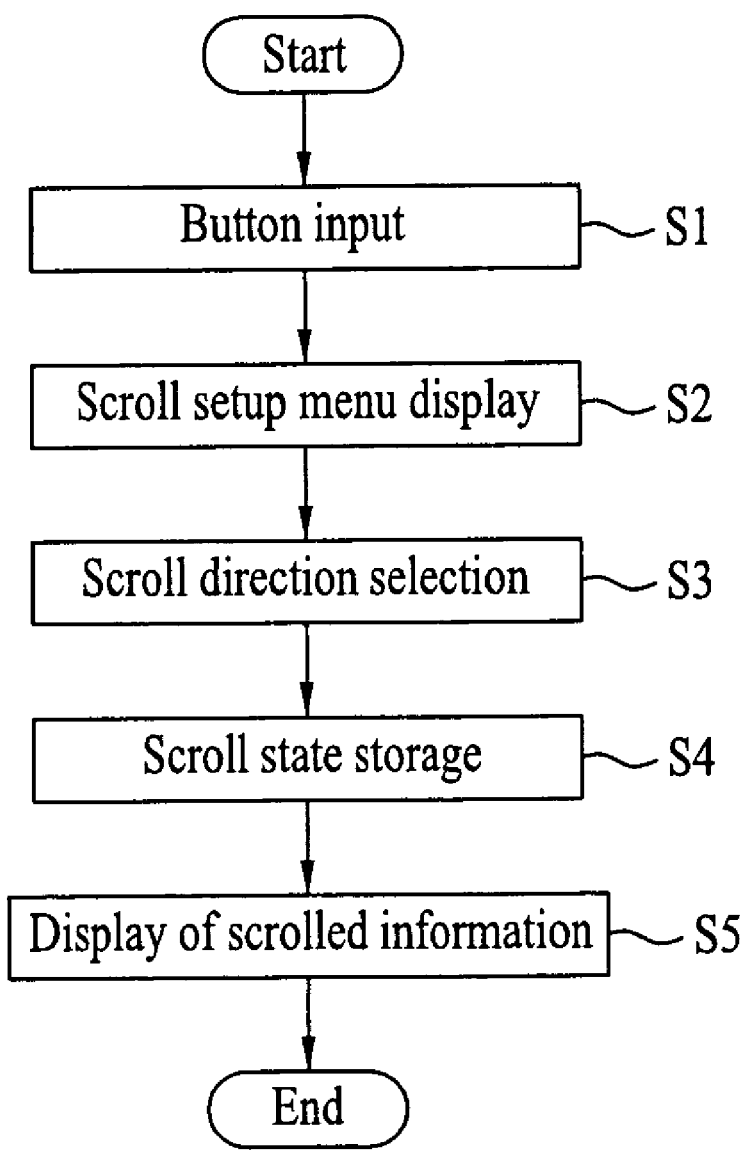
FIG. 5 is a flowchart of a method of setting up a scrolled display state in the washer of FIG. 4.

Referring to FIG. 5, illustrating an operational method of the washer according to the present invention, power of the washer is turned on and a general washing cycle setup is then selected/inputted by a user. The washer executes the corresponding washing cycle and an operational state of the washer appears via the display. In case of intending to see information of the washer by scrolling, the user simultaneously presses at least two of the option buttons for several seconds randomly to enable a scroll setup state (S1). In doing so, the previous information of the operational state of the washer disappears and a menu for setting the scroll direction appears on the display 30 of the washer 30 (S2). A menu for changing the scroll direction appears on the scroll setup menu and an initial value of the scroll direction is set by a left scroll. In case of one rotational operation of the dial, the scroll direction is switched to a right scroll from the left scroll. In case of one further rotational operation of the dial, the scroll setup is switched to an upward scroll. In case of several rotational operations of the dial, the scroll direction of the scroll setup is switched to left, right, upward, and downward directions. Such a setup is repeatedly displayed (S3). After completion of setting the scroll direction, the power button is pressed to store the set scroll information (S4). After completion of the scroll setup, the information of the washing cycle of the washer is scrolled on the display according to the set scroll information (S5).

Accordingly, the present invention sets up the information of the washing cycle to be scrolled using the previous buttons, thereby enabling the small display of the washer to display a large quantity of information with simple operations. Therefore, the present invention enhances user convenience and reduces the size of a display to lower product cost.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A washer comprising:
an input unit for receiving setup items for a washing cycle including at least one of a water supply, quality and a washing course from a user;
a display for displaying a large quantity of information indicating an operational state of a body by scrolling in a plurality of directions;
a microcomputer for controlling an operation according to a value transferred from the input unit and implementing information according to a control result to be displayed via the display by scrolling;
means for providing a scroll setup state; and
a dial unit for setting up the washing cycle and for setting a scroll direction by a rotational operation of a dial when a scroll setup state is provided.

2. A washer comprising:
an input unit for receiving setup items for a washing cycle including at least one of a water supply quantity and a washing course from a user;
a display for displaying a large quantity of information indicating an operational state of a body by scrolling;
a microcomputer for controlling an operation according to a value transferred from the input unit and implementing information according to a control result to be displayed via the display by scrolling;
a button unit providing a scroll setup state by pressing at least two random buttons for several seconds simultaneously; and
a dial unit setting a scroll direction by a rotational operation of a dial if the scroll setup state is provided by the button unit.

3. The washer of claim 2, wherein the dial unit changes the scroll direction into a left, right, upward, or downward direction according to each rotational operation of the dial, and
wherein the dial unit makes the setup of the scroll direction appear repeatedly in case of a continuous rotational operation of the dial.

4. The washer of claim 2, wherein the button unit further comprises a power button for storing scroll data set by the dial unit in case of the scroll setup state.

5. A washer comprising:
an input unit for receiving setup items for the washing cycle including at least one of a water supply quantity and a washing course from a user;
a display for displaying a large quantity of information indicating an operational state of a body by scrolling;
a microcomputer for controlling an operation according to a value transferred from the input unit and implementing information according to a control result to be displayed via the display by scrolling;
an input processor for processing contents inputted from a button unit and a dial unit; and
a display controller for scrolling information on the display according to a value set by the input processor.

6. A washer comprising:
an input unit for receiving setup items for the washing cycle including at least one of a water supply quantity and a washing course from a user;
a display for displaying information indicating an operational state of a body by scrolling;
a microcomputer for controlling an operation according to a value transferred from the input unit and implementing information according to a control result to be displayed via the display by scrolling;
a button unit providing a scroll setup state by pressing at least two random buttons for several seconds simultaneously; and
means for setting a scroll direction by a rotational operation of a dial if the scroll setup state is provided by the button unit.

* * * * *